United States Patent
Fujii et al.

(10) Patent No.: US 9,427,890 B2
(45) Date of Patent: Aug. 30, 2016

(54) KNEADER/STIRRER

(75) Inventors: Atsushi Fujii, Osaka (JP); Koji Yamasaki, Osaka (JP); Kazunori Fukumoto, Osaka (JP)

(73) Assignee: KURIMOTO, LTD., Osaka (JP)

( * ) Notice: Subject to any disclaimer, the term of this patent is extended or adjusted under 35 U.S.C. 154(b) by 108 days.

(21) Appl. No.: 14/131,698

(22) PCT Filed: Jun. 4, 2012

(86) PCT No.: PCT/JP2012/064370
§ 371 (c)(1),
(2), (4) Date: Jan. 15, 2014

(87) PCT Pub. No.: WO2013/008557
PCT Pub. Date: Jan. 17, 2013

(65) Prior Publication Data
US 2014/0146633 A1 May 29, 2014

(30) Foreign Application Priority Data

Jul. 14, 2011 (JP) .................................. 2011-155588

(51) Int. Cl.
*B29B 7/80* (2006.01)
*B01F 7/00* (2006.01)
(Continued)

(52) U.S. Cl.
CPC ................ *B29B 7/805* (2013.01); *B01F 7/003* (2013.01); *B01F 7/00208* (2013.01);
(Continued)

(58) Field of Classification Search
CPC ............ B01F 7/00208; B01F 7/00225; B01F 7/0025; B01F 7/00266; B01F 7/00275; B01F 7/00291; B01F 7/003; B01F 7/00316; B01F 7/046; B29C 47/6006; B29B 7/805

USPC ................ 366/82, 85, 301, 324, 316, 325.7, 366/325.9, 325.91, 325.93, 328.2; 425/204
See application file for complete search history.

(56) References Cited

U.S. PATENT DOCUMENTS 2,814,472 A * 11/1957 Erdmenger ...................... 366/97
3,729,178 A * 4/1973 Stade .............................. 366/84
(Continued)

FOREIGN PATENT DOCUMENTS

JP  62-123238   8/1987
JP  01-317534  12/1989
(Continued)

OTHER PUBLICATIONS

International Search Report issued Aug. 7, 2012 in International (PCT) Application No. PCT/JP2012/064370.
(Continued)

*Primary Examiner* — David Sorkin
*Assistant Examiner* — Abbas Rashid
(74) *Attorney, Agent, or Firm* — Wenderoth, Lind & Ponack, L.L.P.

(57) ABSTRACT

A kneader/stirrer includes two rotary shafts extending parallel to each other in the processing chamber, and first and second regular triangular impellers mounted to the respective rotary shafts. The first impellers are located at the same axial positions as the respective first impellers. The impellers are fixed to the respective rotary shafts at points offset from the centers of the respective impellers in a predetermined direction by a predetermined distance such that when the two rotary shafts rotate in the same direction at the same speed, each pair of first and second impellers are eccentrically pivoted, with one apex of one of the pair of impellers kept in contact with or in close proximity to the contour of the other impeller, thereby scraping off polycondensation resin (material to be processed) adhered to the other impeller.

10 Claims, 8 Drawing Sheets

(51) Int. Cl.
    *B01F 7/04*     (2006.01)
    *B29B 7/48*     (2006.01)
    *B01J 19/00*     (2006.01)
    *B01J 19/18*     (2006.01)
    *B01J 19/20*     (2006.01)
    *C08F 2/01*     (2006.01)

(52) U.S. Cl.
    CPC ...... *B01F 7/00225* (2013.01); *B01F 7/00275* (2013.01); *B01F 7/042* (2013.01); *B01J 19/0066* (2013.01); *B01J 19/1887* (2013.01); *B01J 19/20* (2013.01); *B29B 7/481* (2013.01); *C08F 2/01* (2013.01); *B01J 2219/00094* (2013.01); *B01J 2219/00168* (2013.01)

(56) References Cited

U.S. PATENT DOCUMENTS

| | | | |
|---|---|---|---|
| 3,964,874 A | | 6/1976 | Maruko et al. |
| 4,131,371 A | * | 12/1978 | Tynan .......................... 366/301 |
| 4,824,256 A | * | 4/1989 | Haring et al. .................. 366/85 |
| 4,826,323 A | | 5/1989 | Loomans et al. |
| 5,344,230 A | | 9/1994 | Kowalczyk et al. |
| 6,846,103 B2 | * | 1/2005 | Okamoto et al. ............. 366/297 |
| 2003/0227816 A1 | | 12/2003 | Okamoto et al. |
| 2011/0158039 A1 | | 6/2011 | Bierdel et al. |

FOREIGN PATENT DOCUMENTS

| | | |
|---|---|---|
| JP | 7-24432 | 5/1995 |
| JP | 2004-010791 | 1/2004 |
| JP | 4112908 | 7/2008 |

OTHER PUBLICATIONS

Written Opinion of the International Searching Authority issued Aug. 7, 2012 in International (PCT) Application No. PCT/JP2012/064370 (with English translation).

European Search Report issued Nov. 12, 2014 in European Application No. 12 81 1585.4.

* cited by examiner

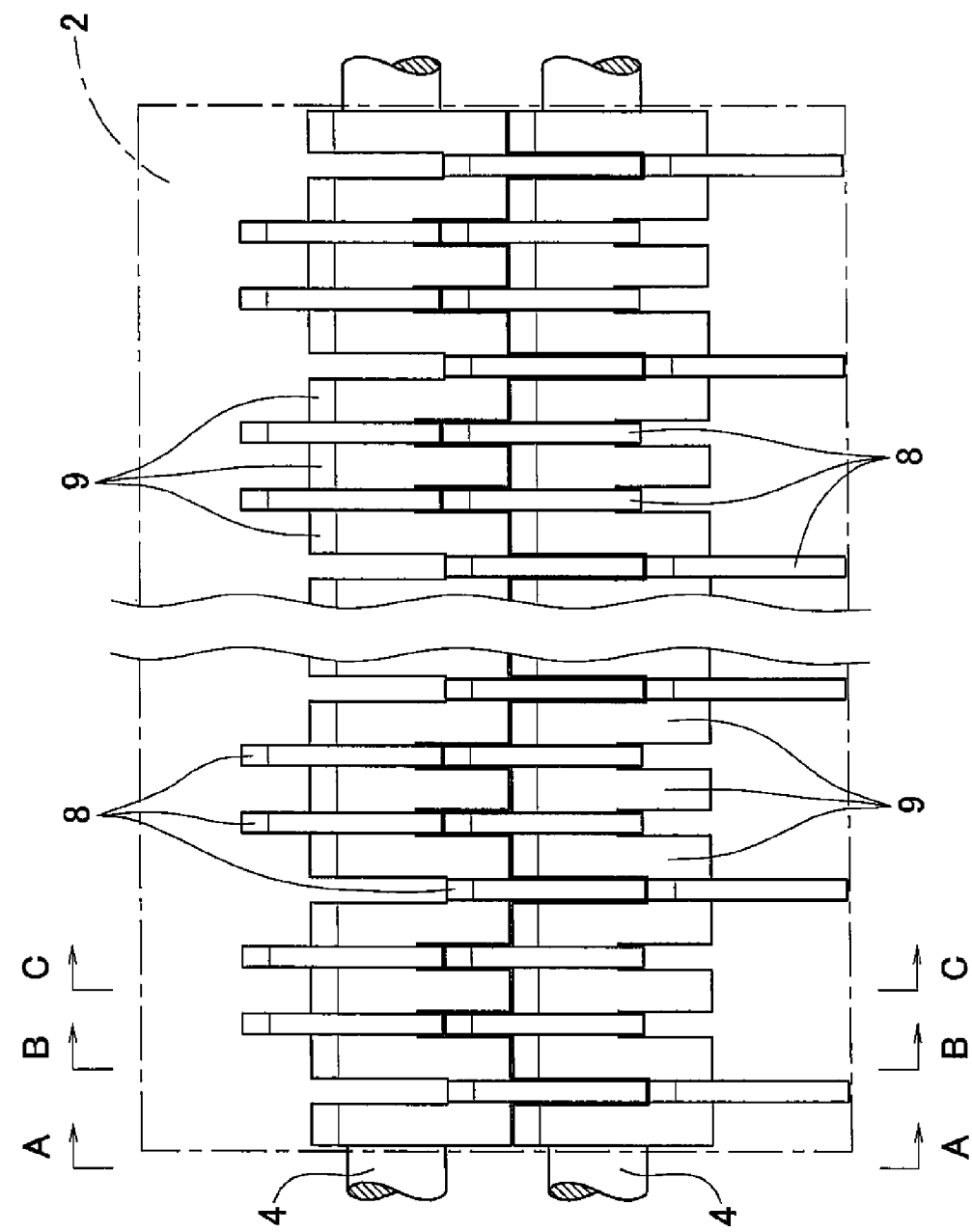

KNEADER/STIRRER

TECHNICAL FIELD

The present invention relates to a kneader/stirrer for kneading and stirring e.g. powder, a liquid or a high-viscosity fluid.

BACKGROUND ART

Some of known kneader/stirrers for kneading and stirring powder liquids and high-viscosity fluids are used as polymerizers for increasing the degree of polymerization of a polycondensation resin with a low degree of polymerization which has been supplied into the kneader/stirrer as a material to be processed, by stirring the resin supplied (see e.g. JP Patent 4112908 and JP Utility Model Publication 62-123238U).

The kneader/stirrer (polymerizer) disclosed in JP Patent 4112908 includes a tubular casing defining therein a processing chamber, and a large number of plate-shaped impellers mounted in the processing chamber so as to be arranged in the axial direction and configured to stir a polycondensation resin. The impellers have lightening holes. The lightening holes enhance polymerization reactions and evaporation of e.g. solvents because the resin is formed into films in the lightening holes.

The device shown in JP Utility Model Publication 62-123238U includes two rotary shafts extending parallel to each other in the processing chamber, a large number of first disk-shaped impellers mounted to one of the rotary shafts so as to be arranged in the axial direction, and second disk-shaped impellers mounted to the other rotary shaft at the same axial positions as the respective first impellers. The respective impellers are fixed to the respective rotary shafts at points offset from the centers of the respective impellers in a predetermined direction by a predetermined distance such that when the two rotary shafts are rotated in the same direction at the same speed, each pair of first and second impellers at the same axial position are eccentrically pivoted while kept in contact with or in close proximity to each other, whereby resin adhered to each of the pair of impellers is removed by the other impeller, while resin adhered to the inner wall of the processing chamber can be also removed by the impellers. This device thus has a self-cleaning ability.

The kneader/stirrer (polymerizer) disclosed in JP Patent 4112908 has a problem in that resin tends to be strongly adhered to the outer peripheries of the impeller and the inner wall of the processing chamber, so that solidified resin tends to become wedged between adjacent impellers or between an impeller and the inner wall of the processing chamber, thus causing trouble during operation.

On the other hand, with the device disclosed in JP Utility Model Publication 62-123238U, due to its self-cleaning ability, resin stuck on the outer peripheries of the impellers and the inner wall of the processing chamber can be removed to a certain extent. But since the impellers are disk-shaped members, they cannot sufficiently remove resin stuck on the impellers and the inner wall of the processing chamber. Rather, such impellers could press resin against the opposed impellers and against the inner wall of the processing chamber, thus causing resin to be more strongly adhered to the impellers and the inner wall of the processing chamber. Thus this device is also not free of the problem resulting from solidified resin becoming wedged between parts.

SUMMARY OF THE INVENTION

An object of the present invention is to provide a kneader/stirrer which have a high self-cleaning ability and thus can be operated for a long period of time.

In order to achieve this object, the present invention provides a kneader/stirrer comprising a tubular casing defining therein a processing chamber, two rotary shafts extending parallel to each other in the processing chamber, first impellers mounted to one of the rotary shafts so as to be arranged in the axial direction of the rotary shaft, and second impellers mounted to the other of the rotary shafts, wherein the first and second impellers are configured to knead and stir a material supplied into the processing chamber, wherein the first impellers are fixed to the one of the rotary shafts at same axial positions as the respective second impellers, wherein at least a pair of first and second impellers at the same axial position have identical regular triangular sectional shapes perpendicular to the axes of the respective rotary shafts, each of the regular triangular sectional shapes having three apexes, and wherein the pair of first and second impellers are fixed to the respective rotary shafts at points offset in a predetermined direction by a predetermined distance such that when the two rotary shafts are rotated in the same rotational direction at the same rotational speed, the pair of first and second impellers are configured to be eccentrically pivoted with one of the three apexes of one of the pair of first and second impellers kept in contact with or close proximity to the contour of the other of the pair of first and second impellers, whereby material to be processed that is adhered to the outer periphery of either of the pair of first and second impellers can be removed by the other of the pair of first and second impellers.

Since the at least a pair of first and second impellers at the same axial position of the respective rotary shafts have identical regular triangular shapes, it is possible to arrange these two impellers such that they are eccentrically pivoted such that material to be processed that is adhered to the outer periphery of one of these impellers can be scraped off and reliably removed by one of the apexes of the other impeller.

Preferably, the pair of first and second impellers are configured such that when the two rotary shafts are rotated in the same rotational direction at the same rotational speed, the pair of first and second impellers are eccentrically pivoted with at least one of the apexes kept in contact with or close proximity to the inner wall of the processing chamber, whereby material to be processed that is adhered to the inner wall of the processing chamber can be removed by the at least one of the apexes.

In this arrangement, each of the pair of first and second impellers is preferably fixed to the corresponding rotary shaft such that the axis of the rotary shaft coincides with a point of the corresponding impeller that is offset from the center of the regular triangular sectional shape in the direction opposite to the direction toward one of the three apexes. With this arrangement, each impeller can be rotated in a balanced manner with the one of its apexes always facing outwardly of the device, which in turn ensures smooth stirring operation.

The present invention is especially effectively applicable to an arrangement in which the kneader/stirrer is used as a polymerizer for increasing the degree of polymerization of a polycondensation resin with a low polymerization degree which is supplied into the processing chamber as the material to be processed, by stirring the polycondensation resin supplied.

If the kneader/stirrer is used as such a polymerizer, the impellers preferably each have a lightening hole such that the polycondensation resin forms a film in the lightening hole while the polycondensation resin is being stirred by the impellers. This promotes polymerization reactions and volatilization of e.g. solvents, thus making it possible to efficiently treat resin.

In the kneader/stirrer according to the present invention, at least a pair of first and second impellers fixed to two rotary shafts extending in the processing chamber parallel to each other at the same axial position in an offset state have identical regular triangular shapes and are arranged such that when they are eccentrically pivoted, one of the apexes of one of the pair of impellers scrape off and reliably remove material to be processed adhered to the outer periphery of the other of the pair of impellers. Thus, this kneader/stirrer is superior in self-cleaning ability to conventional kneader/stirrers, which use disk-shaped impellers, and also can be stably operated for a long period of time.

BRIEF DESCRIPTION OF THE DRAWINGS

FIG. 7 is a plan view of a kneader/stirrer of a second embodiment, showing how the impellers are arranged.

DETAILED DESCRIPTION OF THE INVENTION

Figure 1:
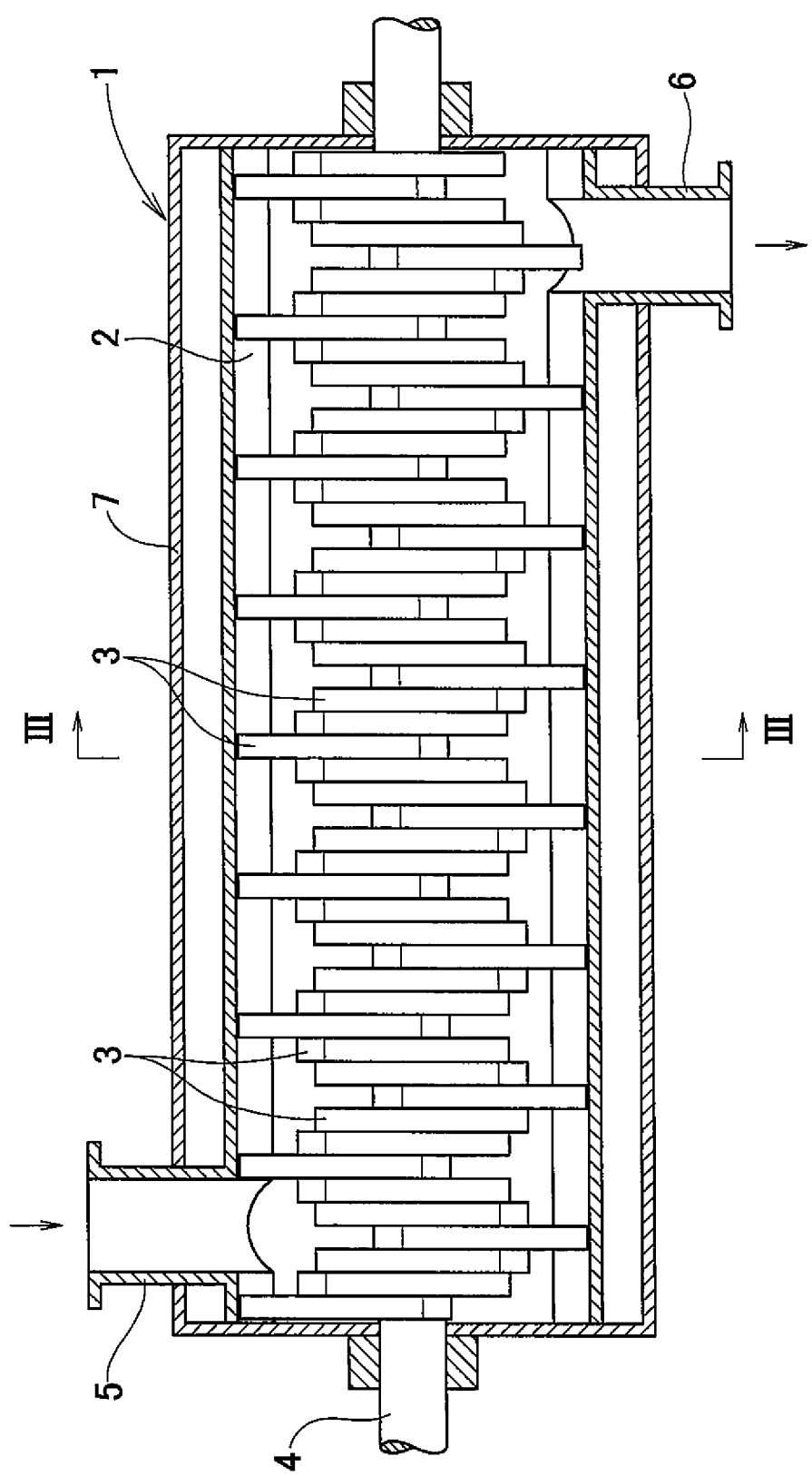
FIG. 1 is a vertical sectional front view of a kneader/stirrer of a first embodiment.
Figure 2:
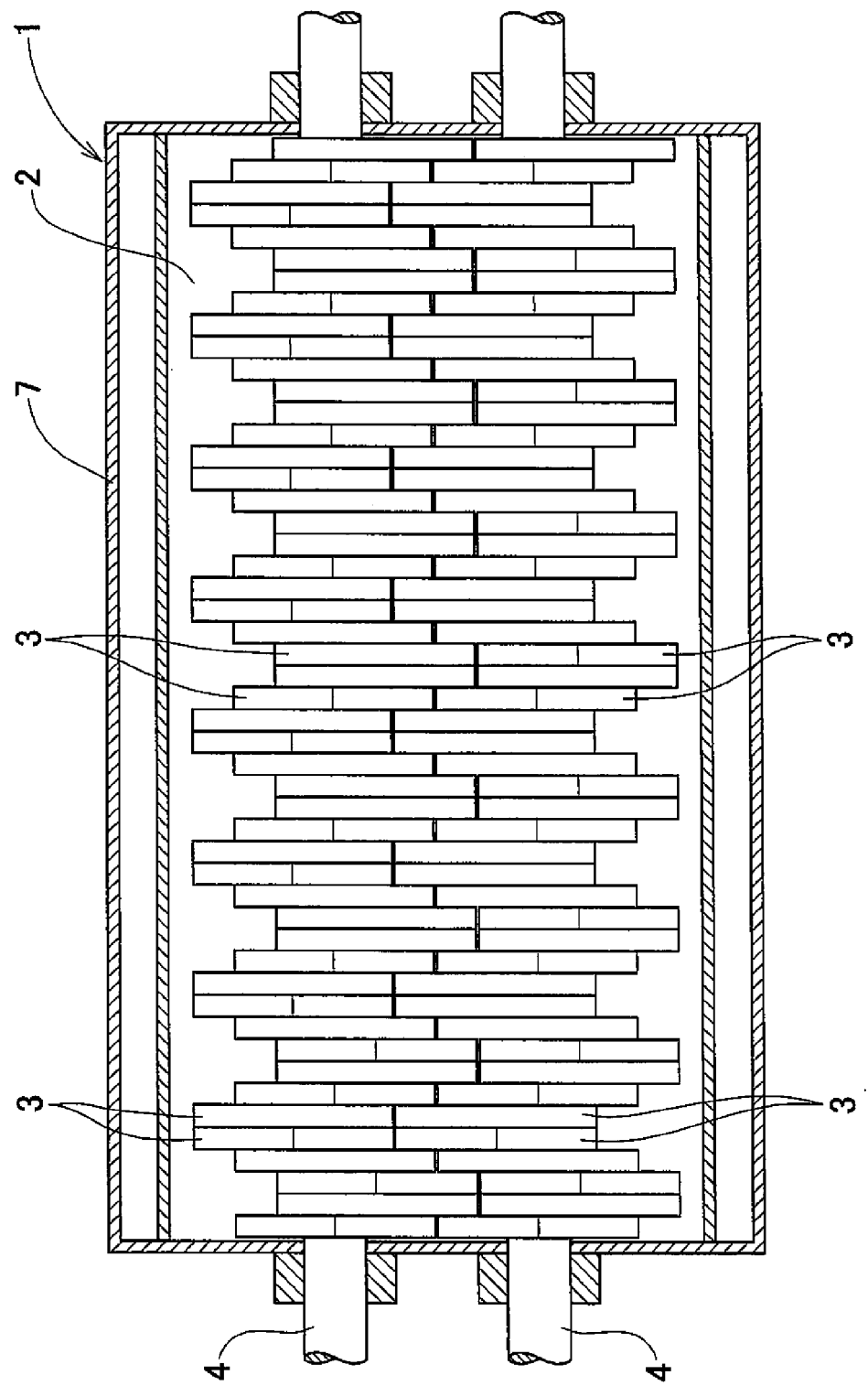
FIG. 2 is a transverse top sectional view of the kneader/stirrer shown in FIG. 1.
Figure 3:
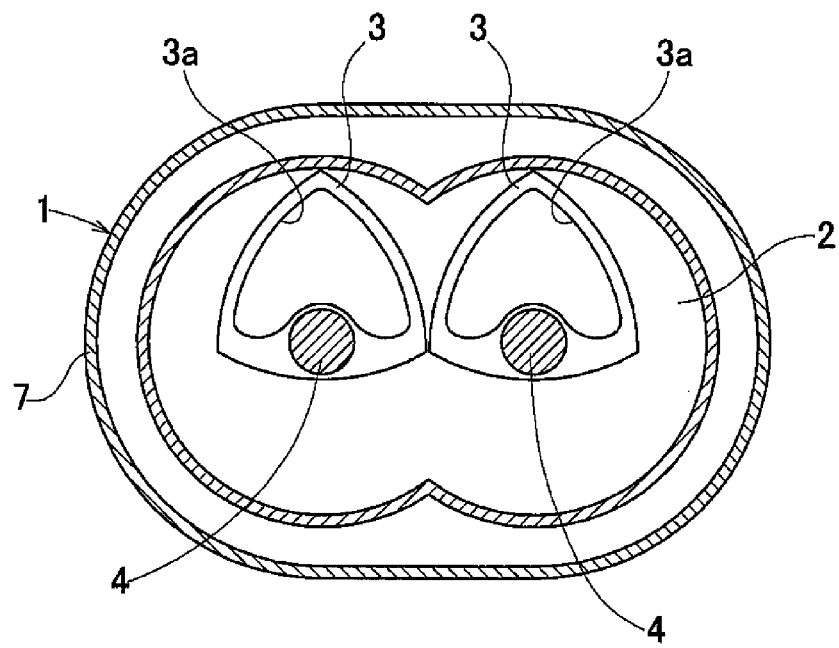
FIG. 3 is a sectional view taken along line III-III of FIG. 1.

The embodiments of the present invention are now described with reference to the drawings. FIGS. 1 to 6(c) show the kneader/stirrer embodying the present invention. This kneader/stirrer is used as a polymerizer for increasing the degree of polymerization of a polycondensation resin with a low polymerization degree which has been fed into the kneader/stirrer, by stirring this resin. As shown in FIGS. 1 to 3, this kneader/stirrer includes a tubular casing 1 having a section formed by two circles equal in diameter and overlapping with each other, and defining therein a processing chamber 2, and two rotary shafts 4 mounted in the processing chamber 2 to extend parallel to each other and each carrying a large number of impellers 3 arranged in the axial direction.

The casing 1 has a supply port 5 provided at one end on top of the casing 1, and a discharge port 6 at the other end on the bottom of the casing 1. The casing 1 has its outer circumferential surface covered with a jacket 7 for heating and cooling the casing, except its portions where there are the supply port 5 and the discharge port 6. The rotary shafts 4 each protrude at both ends from the casing 1 with one of the protruding ends connected to a motor (not shown).

By rotating the respective rotary shafts 4, the polycondensation resin fed into the processing chamber 2 through the supply port 5 of the casing 1 is fed toward the other end of the casing 1 while being kneaded and stirred, and discharged through the discharge port 6 after its polymerization degree has sufficiently increased.

Figure 4:
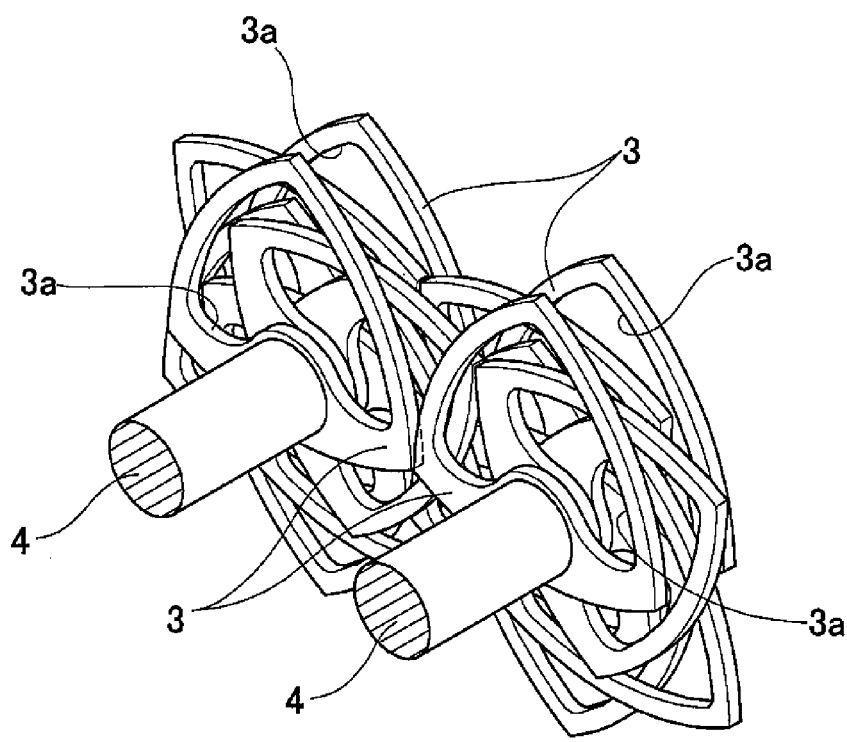
FIG. 4 is a perspective view of portions of the impellers shown in FIG. 1.

As shown in FIGS. 3 and 4, the impellers 3 are frame members having a regular triangular section, with three apexes, as taken along a plane perpendicular to the axis of the rotary shafts 4 and having a central lightening hole 3a. The three sides of the respective regular triangular impellers 3 have identical convex circular arc shapes to provide for the self-cleaning ability, which is described later. The impellers 3 are each fixed to the corresponding rotary shaft 4 such that the center of the rotary shaft 4 is offset from the center of the regular triangle in the direction opposite to the direction toward one of the three apexes by a distance equal to the distance by which the center of any other impeller 3 is offset from the center of the rotary shaft 4. By fixing the respective impellers in this manner, each impeller can be rotated in a balanced manner with the one of its apexes always facing outwardly of the device, as shown in FIG. 5, which in turn ensures smooth stirring operation.

As shown in FIGS. 2 to 4, each pair of impellers 3 are fixed to the respective rotary shafts 4 at the same axial position and with the same phase so as to be adjacent to each other in the direction perpendicular to the axial direction of the rotary shafts 4. Further, any pair of impellers at the same axial position are offset in phase by 60° from the axially adjacent pair or pairs of impellers.

Figure 5:
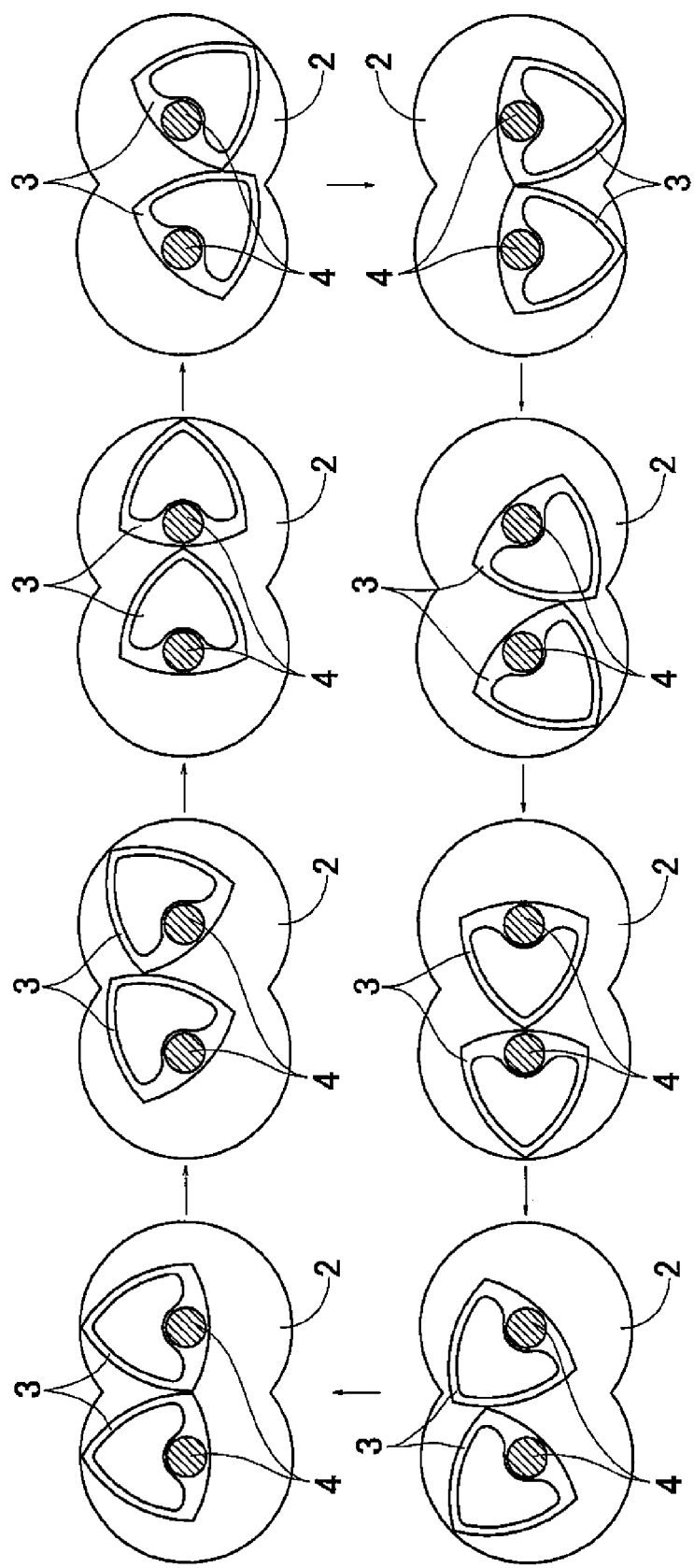
FIG. 5 shows how the impellers of FIG. 1 move.

FIG. 5 shows how the positional relationship between a pair of impellers 3 fixed to the respective rotary shafts 4 at the same axial position changes when the rotary shafts 4 are rotated in the same direction (clockwise in FIG. 5) at the same speed. As is apparent from FIG. 5, the impellers 3 are eccentrically pivoted with one of the apexes of either one of the impellers always kept in contact with or close proximity to the contour of the other impeller, so as to remove resin adhered to the outer periphery of each impeller with one of the apexes of the other impeller. Also, each pair of impellers 3 at the same axial position are arranged such that one of the apexes of at least one of the impellers 3 is always kept in contact with or close proximity to the inner wall of the processing chamber 2 when the impellers are eccentrically pivoted, so as to remove resin adhered to the inner wall of the processing chamber.

Since each pair of regular triangular impellers 3 at the same axial position of this kneader/stirrer are arranged such that when the impellers 3 are eccentrically pivoted, one of the apexes of each impeller 3 can scrape off and reliably remove any resin adhered to the outer periphery of the other impeller 3, and also arranged such that one of the apexes of at least one of the impellers can scrape off and reliably remove any resin adhered to the inner wall of the processing chamber 2. The kneader/stirrer of the embodiment is therefore superior in self-cleaning ability to conventional stirrers, which use disk-shaped impellers, so that it is possible to reliably prevent solidified resin pieces from getting wedged between moving parts in the processing chamber. This kneader/stirrer according to the present invention can be continuously operated for a prolonged period of time.

Since the impellers 3 each have the central lightening hole 3a, resin forms films in the lightening holes 3a, promoting polymerization reactions and volatilization of e.g. solvents. This makes it possible to efficiently treat resin.

Since the impellers 3 are fixed to the rotary shafts 4 at offset points, the processing capacity of the kneader/stirrer is high even though the ratio of the area of each impeller 3 to the sectional area of the processing chamber 2. Preferably, the eccentricity of each impeller 3 (distance between the geometric center of the regular triangle and the axis of the rotary shaft 4) is 10% or over of the distance between the center and one of the apexes, of the regular triangle).

Alternatively, if the processing capacity of the kneader/stirrer of the embodiment may be substantially the same as the processing capacity of conventional kneader/stirrers, of which the impellers are fixed to the rotary shafts at their geometric centers, it is possible to reduce the size of the entire kneader/stirrer according to the present invention, compared to the conventional one, by e.g. reducing the longitudinal dimension of the processing chamber and thus the lengths of the rotary shafts. Shorter rotary shafts are less likely to deflect and thus effectively prevent generation of wear dust in the resin due to contact between impellers.

The kneader/stirrer of the embodiment may be used to knead and stir an ordinary material such as powder, a liquid or a high-viscosity fluid, to separate gas from the material to be processed, or to react a liquid or a high-viscosity fluid with a gas. In these cases too, the kneader/stirrer of the embodiment can be continuously and stably operated for a prolonged period due to the above-described excellent self-cleaning ability.

Figure 6A:
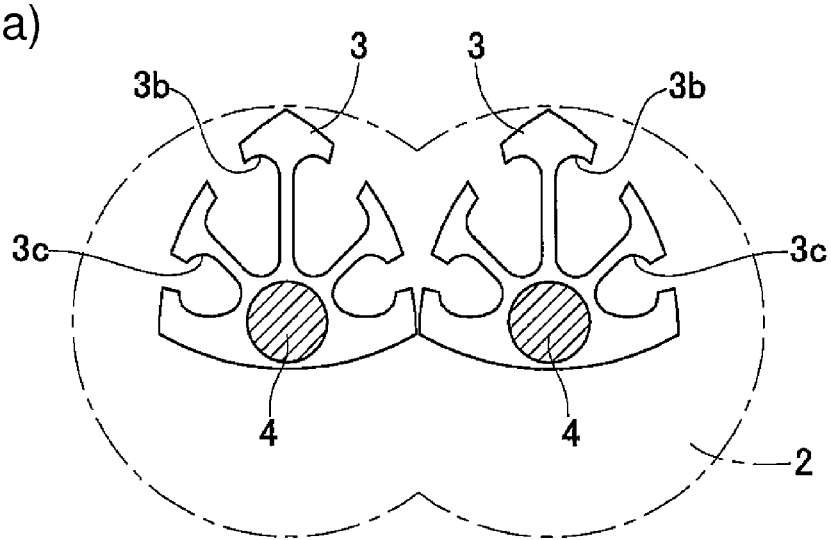
FIGS. 6(a), 6(b) and 6(c) are sectional views of respective modified impellers (modifications of the impellers shown in FIG. 3).
Figure 6B:
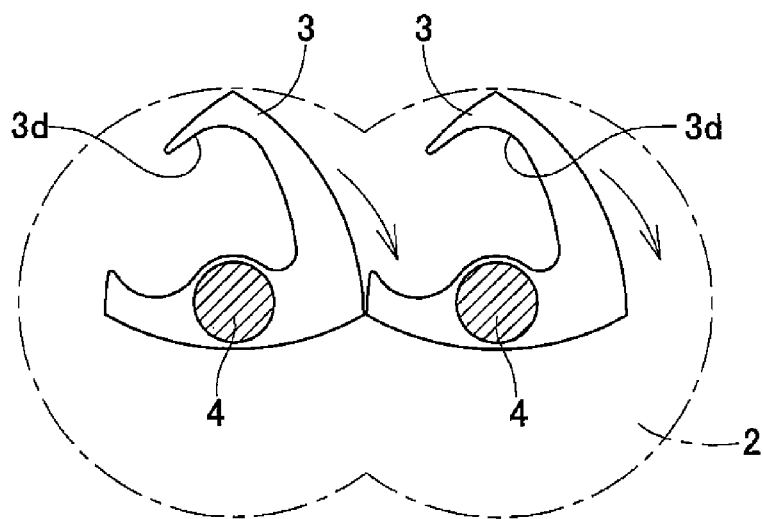
Figure 6C:
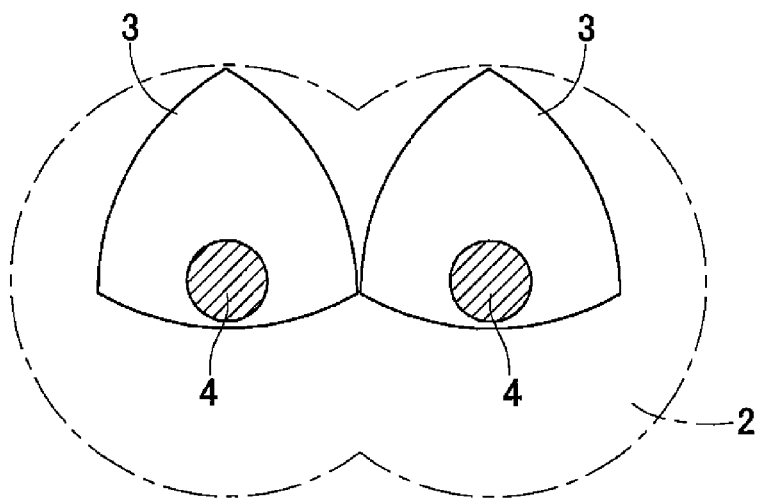

FIGS. 6(*a*) to 6(*c*) show three types of impellers 3 which are different from the impellers of the embodiment and from each other. The impellers 3 of FIG. 6(*a*) each have two lightening holes 3*b* and 3*c* which open to one of two sides of the regular triangle, and additional two lightening holes 3*b* and 3*c* which open to the other of the two sides. The impellers 3 of FIG. 6(*b*) each have a lightening hole 3*d* which, of the two sides of the regular triangle other than the side closest to the corresponding rotary shaft 4, opens to the side on the trailing side with respect to the rotational direction of the impeller 3 (see the arrow in FIG. 6(*b*)). By using the impellers 3 of either type, resin forms films in the lightening holes 3*b* and 3*c* or 3*d*, so that the resin can be processed efficiently, in the same manner as with the frame-shaped impellers 3 shown in FIGS. 1 to 5. The impellers 3 of FIG. 6(*c*) are flat plates having no lightening holes. The kneader/stirrer including such impellers 3 is lower in processing efficiency but can be manufactured more easily.

Figure 8A:
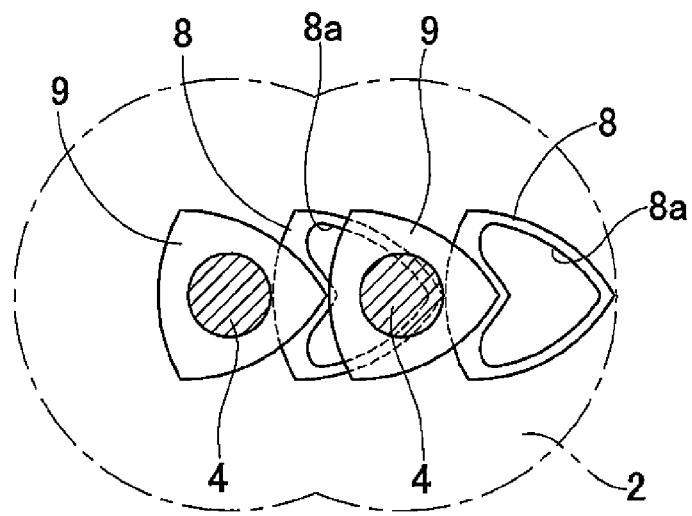
FIGS. 8(a), 8(b) and 8(c) are sectional views taken along lines A-A, B-B and C-C, respectively, of FIG. 7.
Figure 8B:
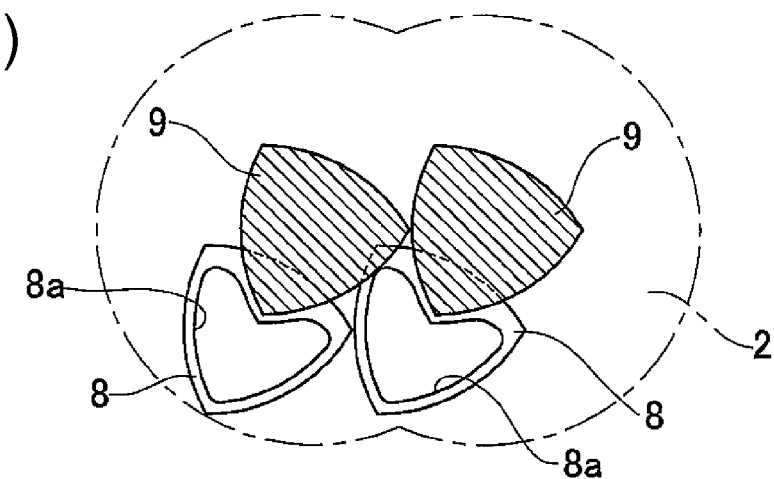
Figure 8C:
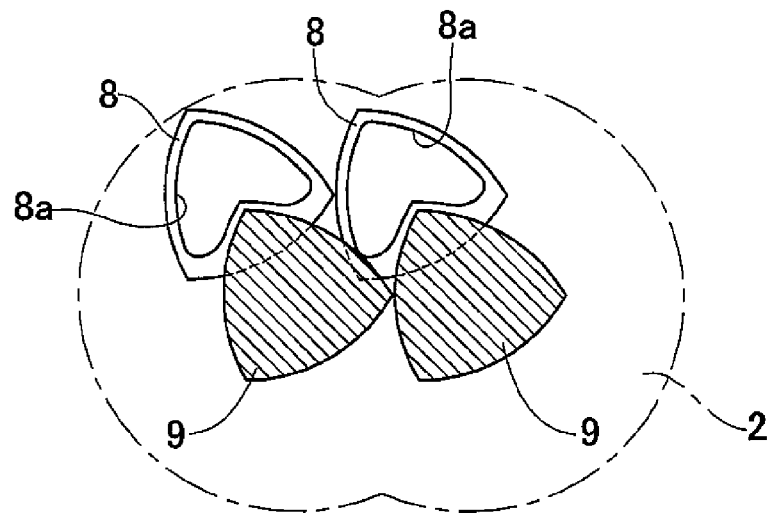
Figure 9:
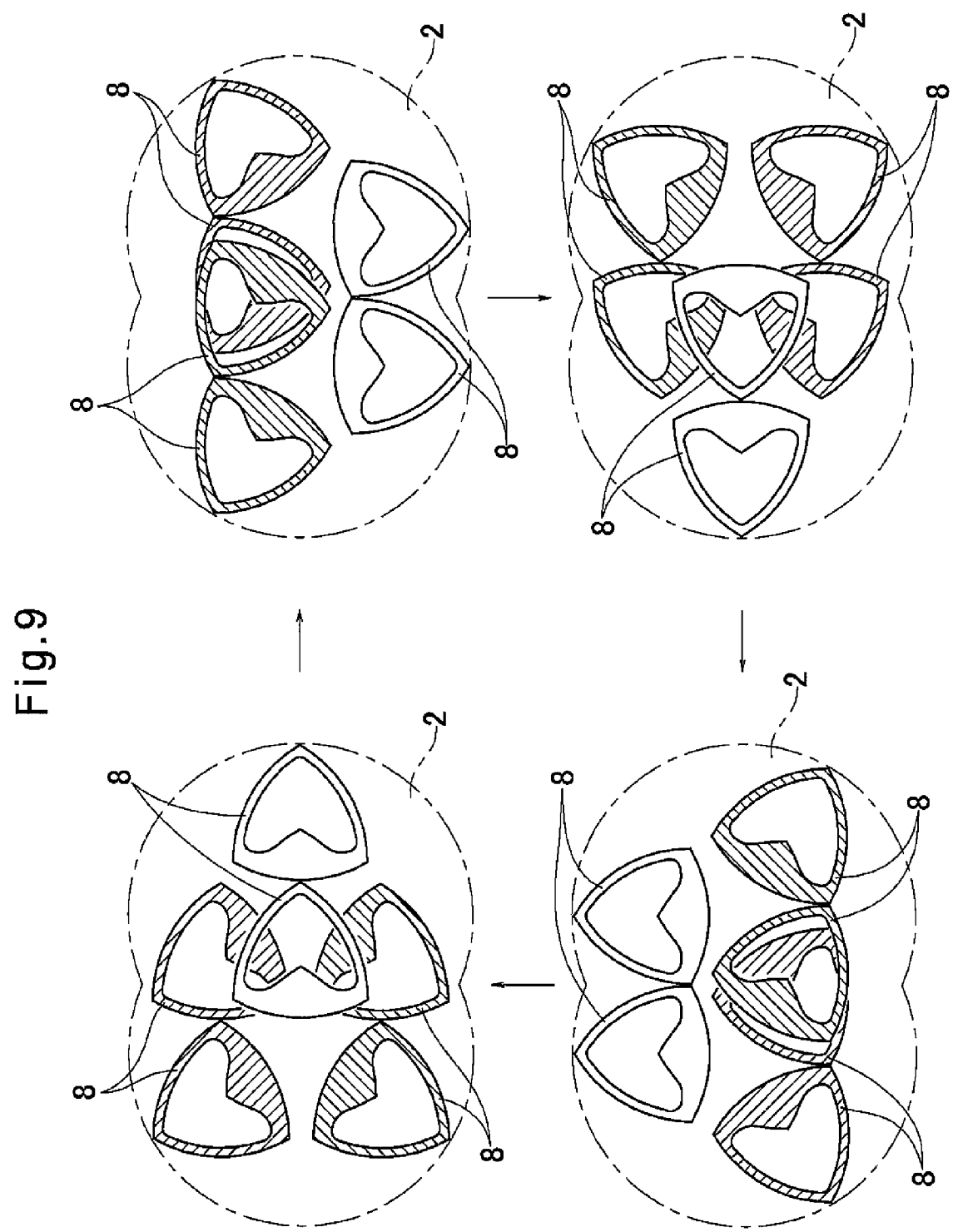
FIG. 9 shows how the impellers of FIG. 7 move.

FIGS. 7 to 9 show the second embodiment, in which as shown in FIGS. 7 and 8, regular triangular impellers 8 having lightening holes 8*a* similar to those of the first embodiment (shown in FIGS. 1 to 5) are arranged in the same manner as with the impellers of the first embodiment, except that the respective impellers 8 are more offset from the corresponding rotary shafts 4 than are the impellers 3 of the first embodiment, and are fixed to the rotary shafts 4 through respective coupling members 9 disposed between the axially adjacent impellers 8.

Thus, each pair of impellers 8 are fixed at offset points to the respective rotary shafts 4 at the same axial position with the same phase so as to be located close to each other. Further, any axially adjacent pairs of impellers 8 are offset in phase from each other. The second embodiment differs from the first embodiment in that the impellers 8 are arranged such that the axes of the rotary shafts 4 do not pass any of the impellers 8 so that the eccentricity of the impellers 8 is larger than that of the impellers of the first embodiment, and that any axially adjacent pairs of impellers 8 are offset in phase by 120°.

The coupling members 9 are of the same shape as the impellers 3 shown in FIG. 6(*c*), and thus are regular triangular plate member having no lightening holes. The coupling members 9 are concentrically fixed to the corresponding rotary shafts 4, and any axially adjacent coupling members 9 sandwich and hold in position the impeller 8 disposed therebetween at a portion of the impeller 8 located close to the axis of the rotary shaft 4.

FIG. 9 shows how axially adjacent three pairs of impellers 8, each pair being fixed to the respective rotary shafts 4 at the same axial position, move relative to one another when the rotary shafts 4 are rotated in the same direction (counterclockwise in FIG. 9) at the same speed. In FIG. 9, the first pair of impellers 8 are not hatched while the second and third pairs of impellers 8 are hatched in different directions from each other. As with the first embodiment, each pair of impellers 8 are eccentrically pivoted such that one of the apexes of either one of the impellers 8 is always kept in contact with or close proximity to the contour of the other impeller 8, thereby scraping off and removing resin adhered to the outer peripheries of the respective impellers, while at least one of the impellers can scrape off and remove resin adhered to the inner wall of the processing chamber 2. While not shown, each pair of coupling members 9 that are provided at the same axial position are also arranged such that each of the pair scrapes off and removes resin adhered to the other of the pair.

The kneader/stirrer of the second embodiment also has a high degree of self-cleaning capability and can be operated for a prolonged period of time, as with the kneader/stirrer of the first embodiment. Moreover, since the eccentricity of the impellers 8 of the second embodiment is larger than that of the impellers of the first embodiment, the processing capacity is higher even though the area of the impellers 8 is small relative to the sectional area of the processing chamber 2.

In either of the embodiments, the impellers 3, 8 are provided on the respective rotary shafts 4 over the entire lengths of the rotary shafts. But under the supply port 5, screws may be provided which are adapted to feed the material to be processed toward the discharge port 6, while under the discharge port 6, screws may be provided which are adapted to feed the material in the reverse direction. Alternatively, the impellers under the supply port 5 may be helically shaped such that the helical impellers can feed the material to be processed toward the discharge port, while the impellers over the discharge port 6 may be helically shaped in the reverse direction to feed the material in the reverse direction.

What is claimed is:

1. A kneader/stirrer comprising a tubular casing defining therein a processing chamber, two rotary shafts extending parallel to each other in the processing chamber, first impellers mounted to one of the rotary shafts so as to be arranged in an axial direction of the one of the rotary shafts, and second impellers mounted to the other of the rotary shafts, wherein the first and second impellers are configured to knead and stir a material supplied into the processing chamber, wherein the first impellers are fixed to the one of the rotary shafts at same axial positions as the respective second impellers, wherein at least a pair of first and second impellers at a same axial position have identical regular triangular sectional shapes along a plane perpendicular to axes of the respective rotary shafts, each of the regular triangular sectional shapes having three apexes, and wherein the pair of first and second impellers are fixed to the respective rotary shafts at points offset in a predetermined direction by a predetermined distance such that when the two rotary shafts are rotated in a same rotational direction at a same rotational speed, the pair of first and second impellers are configured to be eccentrically pivoted with one of the three apexes of one of the pair of first and second impellers kept in contact with or close proximity to a contour of the other of the pair of first and second impellers, whereby the material to be processed that is adhered to an outer periphery of either of the pair of first and second impellers can be removed by the other of the pair of first and second impellers, wherein the kneader/stirrer is used as a polymerizer for increasing a degree of polymerization of a polycondensation resin with a low polymerization degree which is supplied into the processing chamber as the material to be processed, by stirring the polycondensation resin supplied into the processing chamber, wherein the impellers each have a lightening hole such that the polycondensation resin forms a film in the lightening hole while the polycondensation resin is being stirred by the impellers, wherein the two rotary shafts and the first and second impellers are configured so that the two rotary shafts are rotatable in the same rotational direction at the same rotational speed, and wherein, for each of the impellers, the regular triangular sectional shape has three sides, each adjacent pair of the three apexes is joined by one of the three sides, and the lightening hole opens through one of the sides other than the one of the sides closest to the rotary shaft to which the respective impeller is mounted.

2. The kneader/stirrer of claim 1, wherein, for each of the impellers, the lightening hole is one of a pair of lightening holes that both open through said one of the sides.

3. The kneader/stirrer of claim 1, wherein, for each of the impellers, the lightening hole is one of four lightening holes, with two of the four lightening holes opening through said one of the sides, and the other two of the four lightening holes opening through another one of the sides other than the one of the sides closest to the rotary shaft to which the respective impeller is mounted.

4. The kneader/stirrer of claim 1, wherein, for each of the impellers, said lightening hole is the only lightening hole that opens through any of the sides.

5. The kneader/stirrer of claim 1, wherein when the two rotary shafts are rotated in the same rotational direction at the same rotational speed, the pair of first and second impellers are configured to be eccentrically pivoted with at least one of the apexes kept in contact with or close proximity to an inner wall of the processing chamber, whereby the material to be processed that is adhered to the inner wall of the processing chamber can be removed by the at least one of the apexes.

6. The kneader/stirrer of claim 5, wherein each of the pair of first and second impellers is fixed to the corresponding rotary shaft such that the axis of the rotary shaft coincides with a point of the corresponding impeller that is offset from a center of the regular triangular sectional shape in a direction opposite to a direction toward one of the three apexes.

7. The kneader/stirrer of claim 6, wherein the kneader/stirrer constitutes the polymerizer configured to increase the degree of polymerization of the polycondensation resin with the low polymerization degree which is supplied into the processing chamber as the material to be processed, by stirring the polycondensation resin supplied into the processing chamber.

8. The kneader/stirrer of claim 5, wherein the kneader/stirrer constitutes the polymerizer configured to increase the degree of polymerization of the polycondensation resin with the low polymerization degree which is supplied into the processing chamber as the material to be processed, by stirring the polycondensation resin supplied into the processing chamber.

9. The kneader/stirrer of claim 1, wherein each of the pair of first and second impellers is fixed to the corresponding rotary shaft such that the axis of the rotary shaft coincides with a point of the corresponding impeller that is offset from a center of the regular triangular sectional shape in a direction opposite to a direction toward one of the three apexes.

10. The kneader/stirrer of claim 9, wherein the kneader/stirrer constitutes the polymerizer configured to increase the degree of polymerization of the polycondensation resin with the low polymerization degree which is supplied into the processing chamber as the material to be processed, by stirring the polycondensation resin supplied into the processing chamber.

* * * * *